United States Patent [19]

Mackie

[11] Patent Number: 5,681,059
[45] Date of Patent: Oct. 28, 1997

[54] PIPE CONNECTOR

[76] Inventor: Michael J. Mackie, 17 Mayfair Grove, The Woodlands, Tex. 77381

[21] Appl. No.: 573,444

[22] Filed: Dec. 15, 1995

[51] Int. Cl.$^6$ .................................................. F16L 7/00
[52] U.S. Cl. ........................... 285/94; 285/328; 285/330; 285/334; 285/382
[58] Field of Search .................................. 285/382, 328, 285/333, 334, 355, 390, 94, 330, 382.2; 29/525

[56] References Cited

U.S. PATENT DOCUMENTS

| | | | |
|---|---|---|---|
| 3,069,961 | 12/1962 | Baubles | 285/334 X |
| 3,424,479 | 1/1969 | Ditson et al. | 285/94 |
| 3,451,119 | 6/1969 | Coberly et al. | 29/525 X |
| 4,124,229 | 11/1978 | Ahlstone | 29/525 X |
| 4,298,221 | 11/1981 | McGugan | 285/382 X |
| 4,328,983 | 5/1982 | Gibson | 285/382 |
| 4,525,001 | 6/1985 | Lumsden et al. | 285/382 X |
| 4,865,359 | 9/1989 | Roberts | 285/382 X |
| 5,330,242 | 7/1994 | Argent | 285/382 X |

*Primary Examiner*—Dave W. Arola
*Attorney, Agent, or Firm*—Wendy K. Buskop; Chamberlain, Hrdlicka et al.

[57] ABSTRACT

In the present invention there is provided, a pipe connector for use in tendons, risers or other pipe connections. The pipe connector comprises a tubular pin member and a tubular box member. The tubular pin member has a frusto-conical outer peripheral surface, an inner axial end and outer axial end. The tubular box member is telescopically engageable with the pin member and has a frusto-conical inner peripheral surface that further has an inner axial end and an outer axial end. The frusto-conical inner peripheral surface of the tubular box member corresponds to the frusto-conical surface of the pin member and overlies the frusto-conical surface of the pin member when the members are engaged. There is provided annular projection and groove means in the frusto-conical surfaces of the pin member and the box member that interengageable to axially lock the pin member and the box member together. A system for assembling tension-leg pipes using the claimed connector is also provided. A system for assembling machined pipe pieces is provided as well.

12 Claims, 2 Drawing Sheets

PIPE CONNECTOR

BACKGROUND OF THE INVENTION

The present invention relates to pipe connectors particularly but not exclusively designed and adapted for use in connecting pipes and other tubular structures for use on a tension leg platform, floating production system, drilling and/or completion of off-shore oil and/or gas wells. Currently available pipe connectors provide for contact on one end of the structure.

One type of floating offshore production platform is the tension leg platform. This type of platform is anchored by tendons running from the platform to an anchor base on the sea floor. The connection of the tendons to the anchor base presents problems with cycle bending loads as a result of wave and current action on the platform and tendons. Presently available equipment does not accommodate the stresses on the tendon connections in a satisfactory manner.

Additionally, joints used in the oil industry are known in which the ends of two male members are joined by a means of a female member each male member being provided with a thread in the female member. The advantage of using a threaded system is that the torques can be adjusted in using various means depending on the desired result. However it is impractical to use a threaded joint to join two male members that are very long. A connector that can be assembled in the field without tightening by using joints with annular grooves and projections in place of the helical threads. There are several of these connectors on the market but none of the currently available connectors provide for surface-to-surface contact at each end of the assembled connector. Having surface-to-surface contact increases the fatigue life of the connector by at least a factor of ten. A connector that can be used in many different applications with and increased fatigue life would be highly desirable.

OBJECTS OF THE INVENTION

It is an object of the present invention to provide a pipe connector that contacts at both ends of the connector, thereby increasing the connectors ability to withstand fatigue loading.

It is another object of the present invention to provide a pipe connector that displaces stress from the body of the pipe connector to the ends of the connector.

SUMMARY OF THE INVENTION

In the present invention there is provided, a pipe connector for use in tendon connectors, risers or other pipe connections. The pipe connector comprises a tubular pin member and a tubular box member. The tubular pin member has a frusto-conical outer peripheral surface, an inner axial end and outer axial end. The tubular box member is telescopically engageable with the pin member and has a frusto-conical inner peripheral surface that further has an inner axial end and an outer axial end. The frusto-conical inner peripheral surface of the tubular box member corresponds to the frusto-conical surface of the pin member and overlies the frusto-conical surface of the pin member when the members are engaged.

There is provided annular projection and groove means in the frusto-conical surfaces of the pin member and the box member that interengageable to axially lock the pin member and the box member together. The projection and groove means comprise projections and grooves defined by a plurality of crest and root surfaces that are axially spaced apart along the frusto-conical surfaces. The crest surfaces of the projection and groove means define slots therein. The grooves are defined by a pair of spaced radially extending end surfaces interconnected by a root surface and a plurality of axially spaced annular projections in the frusto-conical surface of the other one of the members and corresponding to the grooves of the one member. The projections are defined by a pair of spaced radially extending end surfaces corresponding to end surfaces of the grooves and interconnected by a crest surface.

The crest and root surfaces are arranged so that, on assembly of the pin member and the box member, initial metal-to-metal contact will be made at least between the crest surfaces of some of the projections of the projection means of one of the frusto-conical surfaces and parts of the other one of the frusto-conical surfaces adjacent grooves of the groove means in which the respective projections are to be engaged. This is accomplished by making at least one of the projection and corresponding groove means wider than the rest of the projection and groove means. Subsequent metal-to-metal contact will be made between substantially all of the end surfaces of the projections of one of the frusto-conical surfaces and substantially all of the other one of the frusto-conical surfaces adjacent end surfaces of said grooves in which the respective projections are to be engaged.

The inner axial end of the pin member has a first end surface portion which extends in a generally radial plane and the inner axial end of the box member has a first end surface portion which extends in a generally radial plane. The first end surface portion of the box member contacts the first end surface portion of the pin member when the members are fully engaged together. Likewise, the outer axial end of the pin member has a second end surface portion which extends in a generally radial plane and the outer axial end of the box member has a second end surface portion which extends in a generally radial plane. The second end surface portion of the box member contacts the second end surface portion of the pin member when the members are fully engaged together. The first end surface portions and the second end surface portions of the members are constructed to be in intimate contact in an end surface-to end surface position at each end when the members are fully engaged. End-to-end intimate fit is achieved by positioning a slot in the crest surface of the projections and grooves.

A system for assembling tension-leg pipes is also provided. The system comprises the steps of welding a plurality of box and pin members to a plurality of pipe pieces. The connector comprises a tubular pin member and a tubular box member as described above. The plurality of pin members are welded to one end of a plurality of pipe pieces. The plurality of box members are then welded to the opposite end of the plurality of pipe pieces to form a plurality of tendon sections. Then one of the plurality of tendon sections is held stationary and another of the plurality of tendon sections is inserted into the one tendon section and axially pushing the tendon sections together to form a pipe connector. After engagement, the pin member and the box member are in surface-to-surface contact at each axial end of the connector. This process is repeated until each tension leg is complete.

DETAILED DESCRIPTION OF THE PREFERRED EMBODIMENTS

Figure 1:
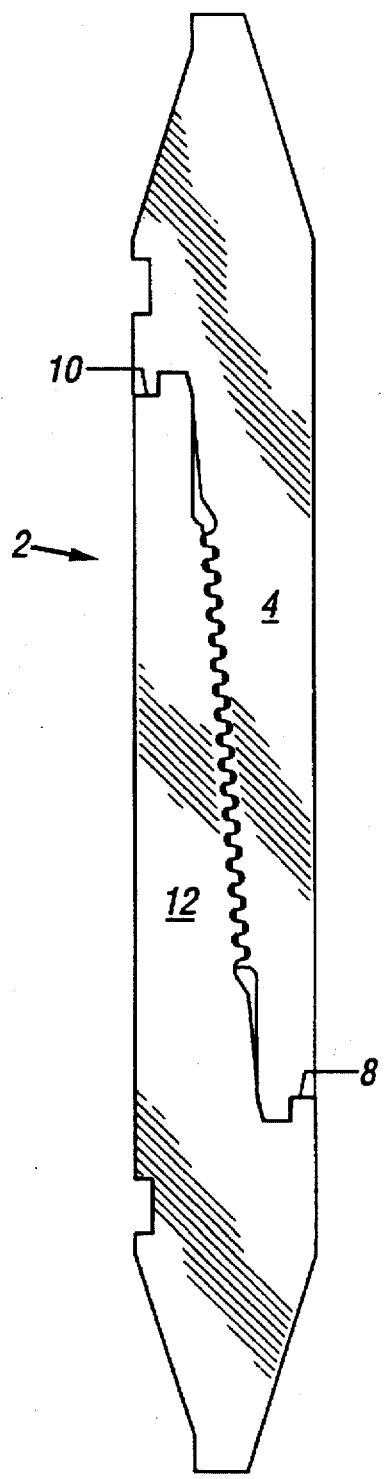
FIG. 1 is a cross-sectional view of the connector.
Figure 3:
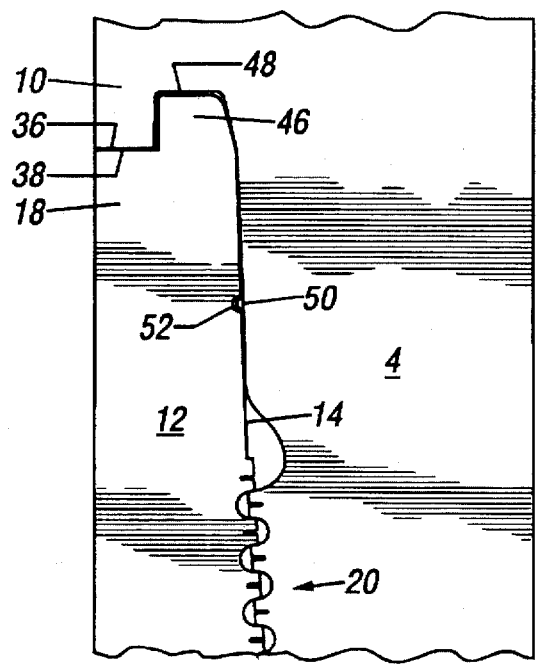
FIG. 3 is a cross-sectional view of the connector showing one end of the connector.

In the present invention there is provided, a pipe connector 2 for use in tension-leg connectors, risers or other pipe connections as shown in FIG. 1. The pipe connector 2 comprises a tubular pin member 4 and a tubular box member 12. The tubular pin member 4 has a frusto-conical outer peripheral surface 6, an inner axial end 8 and outer axial end 10. The tubular box member 12 is telescopically engageable with the pin member 4 and has a frusto-conical inner peripheral surface 14 that further has an inner axial end 16 and an outer axial end 18 as shown in FIG. 3. The frusto-conical inner peripheral surface 14 of the tubular box member 12 corresponds to the frusto-conical surface 6 of the pin member and overlies the frusto-conical surface 6 of the pin member 4 when the members are engaged. Preferably, the frusto-conical surfaces 6 and 14 define an angle of conicity of about 5 degrees. The pipe connector can be made from a high strength micro alloy steel, titanium, and composite materials, or combinations thereof. (ie. AISI 4140, AISI 4145, HY-80, HY-100, ASTM-A707 available from Standard Steel Pennsylvania).

Figure 2:
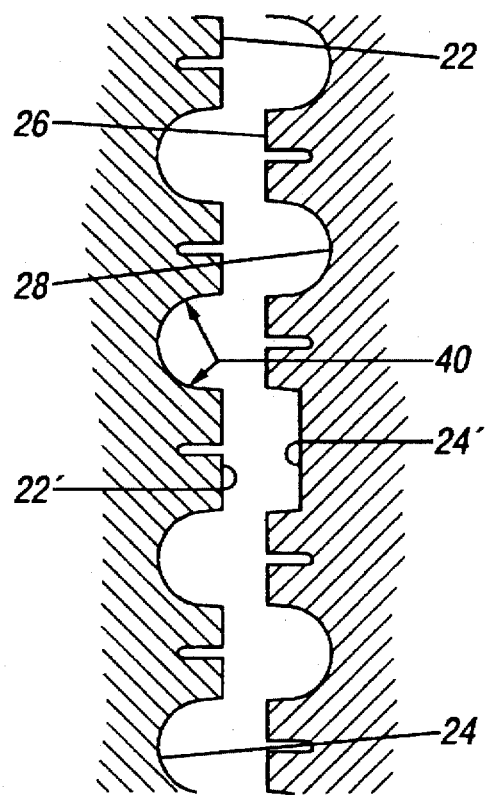
FIG. 2 is a cross-sectional view of the frusto-conical inner surface of the box member and the frusto-conical outer surface of the pin member.

There is provided annular projection and groove means 20 in the frusto-conical surfaces of the pin member and the box member that interengageable to axially lock the pin member and the box member together. The projection and groove means 20 comprise projections 22 and grooves 24 defined by a plurality of crest 26 and root 28 surfaces that are axially spaced apart along the frusto-conical surfaces. The crest surfaces 26 of the projection and groove means define slots 30 therein as shown in FIG. 2.

Figure 5:
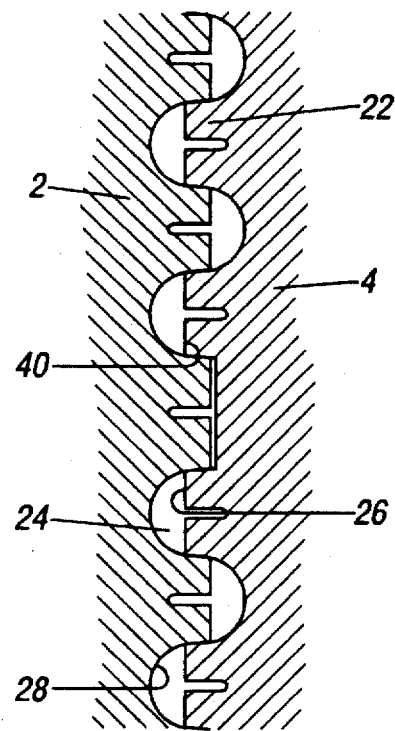
FIG. 5 is a cross-sectional view of a portion of the connector with the box and pin member fully engaged.
Figure 4:
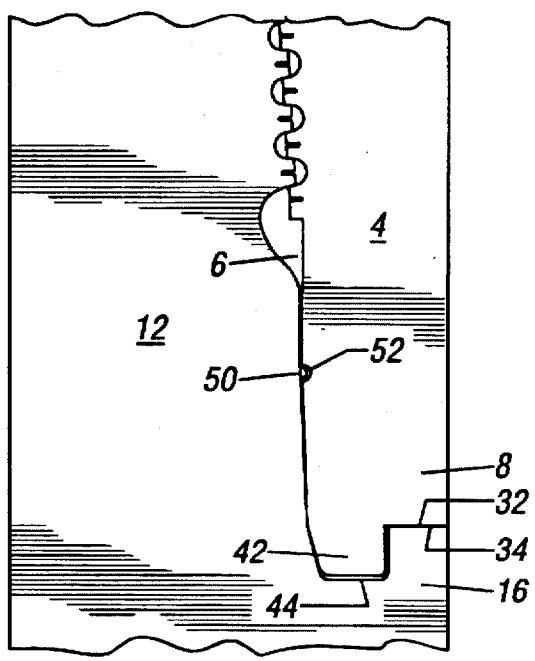
FIG. 4 is a cross-sectional view of the connector showing the opposite end of the connector.

The crest 26 and root 28 surfaces are arranged so that, on assembly of the pin member 4 and the box member 12, initial metal-to-metal contact will be made at least between the crest surfaces of some of the projections of the projection means of one of the frusto-conical surfaces and parts of the other one of the frusto-conical surfaces adjacent grooves of the groove means in which the respective projections are to be engaged. This is accomplished by making at least one of the projections 22' and corresponding grooves 24' wider than the rest of the projections and grooves as shown in FIG. 2. Subsequent metal-to-metal contact will be made between substantially all of the end surfaces 40 of the projections 22 of one of the frusto-conical surfaces and substantially all of the other one of the frusto-conical surfaces adjacent end surfaces of said grooves 28 in which the respective projections are to be engaged as shown in FIG. 5.

The inner axial end of the pin member 4 defines a first axial protrusion 42 corresponding to a first axial recess 44 defined by said inner axial end of said box member. When the box and pin member are fully engaged the first protrusion 42 contacts the first axial recess 44. The outer axial end of the pin member 4 defines a second axial protrusion 46 corresponding to a second axial recess 48 defined by the outer axial end of the box member. Ben the box and pin member are fully engaged the second protrusion 46 contacts the second axial recess 48. The contact between the recesses and protrusions stops the connector from peeling apart under tension, pressure, and/or bending, depending on the application.

Preferably, at least some of the projections and grooves have crest and corresponding root widths greater than the remaining projections and grooves. This allows the pin and box member to only fully engage at its final position because all projections mate only with the proper corresponding groove. These wider width projections and grooves can be positioned such that the box and pin members are supported as they are engaged.

The inner axial end 8 of the pin member 4 has a first end surface portion 32 which extends in a generally radial plane and the inner axial end 16 of the box member 12 has a first end surface portion 34 which extends in a generally radial plane. The first end surface portion 34 of the box member 12 contacts the first end surface portion 32 of the pin member when the members 4 and 16 are fully engaged together. Likewise, the outer axial end 10 of the pin member has a second end surface portion 36 which extends in a generally radial plane and the outer axial end 18 of the box member 12 has a second end surface portion 38 which extends in a generally radial plane. The second end surface portion 38 of the box member contacts the second end surface portion 36 of the pin member when the members 4 and 12 are fully engaged together. The first end surface portions and the second end surface portions of the members are constructed to be in intimate contact in an end surface-to end surface position at each end when the members are fully engaged.

End-to-end intimate fit is achieved by positioning a slot 30 in the crest surface 26 of the projections 22 and grooves 24. Preferably, the slots 30 are positioned generally perpendicular to the crest surfaces 26. The grooves 24 are defined by a pair of spaced radially extending end surfaces 40 interconnected by a root surface 28 and a plurality of axially spaced annular projections 22 in the frusto-conical surface of the other one of the members and corresponding to the grooves of the one member. The projections 22 are defined by a pair of spaced radially extending end surfaces corresponding to end surfaces 40 of the grooves and interconnected by a crest surface 26. As indicated above, the crest surfaces of the grooves and projections have slots 30 positioned therein.

The number of projections and grooves in a particular pipe connector will vary according to the intended use. The pipe connector described herein can be used in tension-leg platforms, risers, pipelines, or other pipe connections. In a typical pipe section having a 32 inch diameter and a 1½ inch thickness, the end surface facing the top of the connector is at an angle of 5 degrees relative to the longitudinal axis of the connector where the end surface facing the bottom of the connector is at an angle of 15 degrees with respect to the longitudinal axis of the connector. The height of the projection is 0.080 inches relative to the radial axis of the connector. The slot causes the end surfaces of corresponding grooves and projections to contact one another when the connecter is fully engaged. Contacting the end surfaces of the projections and grooves as well as the end surfaces of the pin and box member increases the fatigue life of the connector by up to a factor of 10.

In the present invention it is preferred that the radial dimensions, the thickness and the elastic modulus of the projections and grooves are such that the expansion of the box member and/or contraction of the pin member resulting from assembly and disassembly of the members does not exceed the elastic limit of the material of the box member and/or the pin member. Additionally, the pin member and the box member are arranged so that surfaces thereof engage one another in intimate contact in an end surface-to end surface position at each end when the pin member and the box member are fully interengaged.

In a preferred embodiment, a portion of the frusto-conical outer peripheral surface 6 of the pin member 4 can be helically threaded corresponding to a helically threaded portion of the frusto-conical inner peripheral surface 14 of the box member 12. In this embodiment a plurality of interlocking circumferential rings 50 and grooves 52 on the inner frusto-conical peripheral surface of the box member 12 and the outer frusto-conical peripheral surface of the pin member 4 are required.

In a preferred embodiment, the inner frusto-conical peripheral surface of the box member and the outer frusto-conical peripheral surface of the pin member are coated with an environmentally friendly, lubricating, corrosion resistant material. This material can be selected from the group comprising manganese phosphate compounds or equivalent. Another alternative are materials that pass the SHRIMP test or other environmental regulations.

Preferably, the box member is provided with a a means for transmitting fluid under pressure, between the box member and the pin member, causing expansion of the box member and/or contraction of the pin member for assisting in the assembly and/or disassembly of the connector. The means for transmitting fluid can be a radial passage for connection to a supply of fluid under pressure. The passage communicates with an axially extending groove in the frusto-conical surface of the box member, the groove extending centrally of the region provided with the projection and groove means of the assembled pin and box members. Fluid is communicated under pressure to the projection and groove means for causing expansion of the box member and/or contraction of the pin member for assisting in the assembly and/or disassembly of the connector. The initial metal-to-metal contact between the crest surfaces providing sealing for the fluid. Any type of hydraulic fluid may be used such as Aeroguard TSO-HD available from Aerocote Inc., Houston, Tex. or an equivalent.

A system for assembling tension-leg pipes is also provided. The system comprises the steps of welding a plurality of box and pin members to a plurality of pipe pieces. The tubular pin members and tubular box members are as described above, The plurality of pin members are welded to one end of a plurality of pipe pieces. The plurality of box members are then welded to the opposite end of the plurality of pipe pieces to form a plurality of tendon sections. Then one of the plurality of tendon sections is held stationary and another of the plurality of tendon sections is inserted into the one tendon section and axially pushing the tendon sections together to form a pipe connector. After engagement, the pin member and the box member are in surface-to-surface contact at each axial end of the connector. This process is repeated until each tension leg is complete.

A system for assembling pipe sections is also provided. The system comprises providing a plurality of tubular pin and tubular box members as described above. The plurality of pin members are machined into one end of a plurality of pipe pieces. The plurality of box members are machined into an opposite end of the plurality of pipe pieces to form a plurality of pipe joints. To assemble, one of said plurality of pipe joints is held stationary and another of said plurality of pipe joints is inserted into said one pipe joint and axially pushing the pipe joints together to form a pipe connector. After assembly, the pin member and the box member are in surface-to-surface contact at each axial end of the connector.

What is claimed is:

1. A pipe connector comprising:
    a tubular pin member having a frusto-conical outer surface having an inner axial end and outer axial end;
    a tubular box member telescopically engageable with said pin member and having a frusto-conical inner surface having an inner axial end and an outer axial end, said frusto-conical inner surface of said tubular box member corresponding to said frusto-conical outer surface of said pin member and which overlies said frusto-conical outer surface of said pin member when said members are engaged; and
    annular projection means and annular groove means provided in said frusto-conical surfaces of said pin member and said box member extending circumferentially thereof and being inter-engageable to axially lock said pin member and said box member together;
    said projection means comprising annular projections and said groove means comprising annular grooves separating said annular projections,
    each said projection being defined by a pair of spaced radially extending end surfaces corresponding to end surfaces of said grooves and interconnected by a crest surface;
    each said groove being defined by a pair of spaced radially extending end surfaces of adjacent projections interconnected by a root surface;
    wherein a plurality of axially spaced annular projections in said frusto-conical surface of the one of said members corresponds to grooves in the other of said members,
    said projections and grooves being axially spaced apart along said frusto-conical surfaces and being arranged so that, on assembly of said pin member and said box member, initial metal-to-metal contact will be made at least between said crest surfaces of some of said projections of said projection means of one of said frusto-conical surfaces and pans of the other one of said frusto-conical surfaces adjacent grooves of said groove means in which said respective projections are to be engaged, wherein subsequent metal-to-metal contact will be made between substantially all of said end surfaces of said projections of one of said frusto-conical surfaces and substantially all of the other one of said frusto-conical surfaces adjacent end surfaces of said grooves in which said respective projections are to be engaged;
    said crest surfaces of said projection, means defining slots therein;
    said inner axial end of said pin member defines a first axial protrusion corresponding to a first axial recess defined by said inner axial end of said box member, wherein when said box and pin member are fully engaged said first protrusion contacts said first axial recess;
    said outer axial end of said pin member defines a second axial protrusion corresponding to a second axial recess defined by said outer axial end of said box member, wherein when said box and pin member are fully engaged said second protrusion contacts said second axial recess;
    wherein said inner axial end of said pin member has a first end surface portion which extends in a generally radial plane and said inner axial end of said box member has a first end surface portion which extends in a generally radial plane and contacts said first end surface portion of said pin member when said members are fully engaged together;
    said outer axial end of said pin member has a second end surface portion which extends in a generally radial plane and said outer axial end of said box member has a second end surface portion which extends in a generally radial plane and contacts said second end surface portion of said pin member when said members are fully engaged together; and wherein said first end surface portions and said second end surface portions of said members are constructed to be in intimate contact in an end surface-to-end surface position at each end when said members are fully engaged.

2. The pipe connector of claim 1, wherein the radial dimensions, the thickness and the elastic modulus of said pin member and said box member are such that the expansion of said box member and contraction of said pin member resulting from assembly and disassembly of said members does not exceed the elastic limit of the material of said box member and said pin member; and said pin member and said box member are arranged so that surfaces thereof engage one another in intimate contact in an end surface-to-end surface position at each end when said pin member and said box member are fully interengaged.

3. The pipe connector of claim 1, wherein said slots are positioned generally perpendicular to said crest surfaces.

4. The pipe connector of claim 1, wherein said frusto-conical surfaces define an angle of conicity of about 5 degrees.

5. The pipe connector of claim 1, further comprising helical threads on a portion of the frusto-conical outer surface of the pin member and corresponding helical threads On a portion of the frusto-conical inner surface of the box member.

6. The pipe connector of claim 5, further comprising a plurality of circumferential rings and grooves formed by the helical threads on the inner frusto-conical surface of the box member that interlock with a plurality of circumferential rings and grooves formed by the helical threads on the outer frusto-conical surface of the pin member.

7. The pipe connector of claim 1, wherein at least some of the projections and corresponding grooves have crest and corresponding root widths greater than the remaining projections and grooves so that all annular projections mate with the proper corresponding annular grooves when the pin member and the box member are fully engaged at a final position.

8. The pipe connector of claim 1, wherein the inner frusto-conical peripheral surface of the box member and the outer frusto-conical peripheral surface of the pin member are coated with an environmentally friendly, lubricating, corrosion resistant material.

9. The pipe connector of claim 8, wherein the environmentally friendly, lubricating, corrosion resistant material is selected from the group comprising manganese phosphate compounds.

10. The pipe connector of claim 1, wherein the pipe connector comprises at least one material selected from the group consisting of high strength micro alloy steel, titanium, and composite materials.

11. The pipe connector of claim 1, wherein said box member is provided with a means for transmitting fluid under pressure, between said box member and said pin member, causing expansion of said box member and contraction of said pin member for assisting in the assembly and disassembly of said connector.

12. A pipe connector comprising:
a tubular pin remember having a frusto-conical outer surface having an inner axial end and outer axial end;
a tubular box member telescopically engageable with said pin member and having a frusto-conical inner surface having an inner axial end and an outer axial end said frusto-conical inner surface of said tubular box member corresponding to said frusto-conical outer surface of said pin member and which overlies said frusto-conical outer surface of said pin member when said members are engaged;

wherein said frusto-conical surfaces of said pin and box member have an angle of conicity of about 5 degrees; and annular projection means and annular groove means provided in said frusto-conical surfaces of said pin member and said box member extending circumferentially thereof and being inter-engageable to axially lock said pin member and said box member together;

said projection means comprising annular projections and said groove means comprising annular grooves separating said annular projections, each said projection being defined by a pair of spaced radially extending end surfaces corresponding to end surfaces of said grooves and interconnected by a crest surface;

each said groove being defined by a pair of spaced radially extending end surfaces of adjacent projections interconnected by a root surface;

wherein a plurality of axially spaced annular projections in said frusto-conical surface of the one of said members corresponds to grooves in the other of said members, said projections and grooves being axially spaced apart along said frusto-conical surfaces and being arranged so that, on assembly of said pin member and said box member, initial metal-to-metal contact will be made at least said crest surfaces of some of said projections of said projection means of one of said frusto-conical surfaces and parts of the other one of said frusto-conical surfaces adjacent grooves of said groove means in which said respective projections are to be engaged, wherein subsequent metal-to-metal contact will be made between substantially all of said end surfaces of said projections of one of said frusto-conical surfaces and substantially all of the other one of said frusto-conical surfaces adjacent end surfaces of said grooves in which said respective projections are to be engaged;

wherein at least some of the projections and corresponding grooves have crest and corresponding root widths greater than the remaining projections and grooves;

said crest surfaces of said projection means defining slots therein, said slots being positioned generally perpendicular to said crest surfaces;

wherein said inner axial end of said pin member has a first end surface portion which extends in a generally radial plane and said inner axial end of said box member has a first end surface portion which extends in a generally radial plane and contacts said first end surface portion of said pin member when said members are fully engaged together;

said outer axial end of said pin member has a second end surface portion which extends in a generally radial plane and said outer axial end of said box member has a second end surface portion which extends in a generally radial plane and contacts said second end surface portion of said pin member when said members are fully engaged together;

wherein said first end surface portions and said second end surface portions of said members are constructed to be in intimate contact in an end surface-to end surface position at each end when said member are fully engaged;

wherein the radial dimensions, the thickness and the elastic modulus of said box member and said pin member are such that the expansion of said box member and contraction of said pin member resulting from assembly and disassembly of said members does not exceed the elastic limit of the material of said box member and said pin member; and said pin member and said box member are arranged so that surfaces thereof engage one another in intimate contact in an end surface-to-end surface position at each end when said pin member and said box member are fully interengaged;

wherein helical threads are on a portion of the frusto-conical outer surface of the pin member and corresponding helical threads are on a portion of the frusto-conical inner surface of the box member; and wherein the inner frusto-conical surface of the box member and the outer frusto-cortical surface of the pin member are coated with an environmentally friendly, lubricating, corrosion resistant material selected from the group comprising manganese phosphate compounds.

\* \* \* \* \*